Oct. 19, 1965 A. P. STROM 3,213,254
ARC RESISTANT ORIFICE EMBODYING FLUOROCARBON
RESINS AND A PLASTIC MEMBER
Filed Dec. 31, 1962

WITNESSES
Theodore F. Wrobel
James F. Young

INVENTOR
Albert P. Strom
BY
Clement L. McHale
ATTORNEY

3,213,254
ARC RESISTANT ORIFICE EMBODYING FLUORO-CARBON RESINS AND A PLASTIC MEMBER

Albert P. Strom, Pittsburgh, Pa., assignor to Westinghouse Electric Corporation, Pittsburgh, Pa., a corporation of Pennsylvania
Filed Dec. 31, 1962, Ser. No. 248,633
1 Claim. (Cl. 200—166)

The present invention relates to high temperature chambers and orifices, and more particularly to high temperature chambers and orifices for use in arc interrupting apparatus.

In arc interrupting apparatus, porcelain tubes are often used as the insulating arc chamber to contain various interrupting media, such as oil or gas. Porcelain is well suited for this function except that it is very brittle and difficult to inspect for flaws. If such a porcelain arc chamber is filled with gas under pressure, or if pressure is suddenly built up due to internal arcing, there is danger that the porcelain may burst due to a hidden flaw. This being the case, there is a possibility of danger to nearby personnel and apparatus. The orifices which are used to introduce the interrupting media such as a sulfur hexafluoride, $SF_6$ gas, are also in contact with the high temperatures and pressures of the arc chamber. At present, various insulating materials are used to protect such orifices from damage from the arcing operation in the chamber. Among the materials presently used are solid tubes of fluorocarbon resins such as tetrafluoroethylene resins and fluorinated ethylene propylene resins. The use of solid tubes of fluorocarbon resins is expensive, and improved structures having similar resistance to arc, chemical and pressure damage would be advantageous.

It is, therefore, an object of the present invention to provide improved chamber and orifice structures for use in arc interrupting apparatus.

It is a further object of the present invention to provide an improved arc chamber for use in arc interrupting apparatus employing a fluorocarbon resin adjacent the arcing area.

It is a further object of the present invention to provide an improved method of fabricating an arc resistant structure.

Broadly, the present invention accomplishes the above objects by providing an arc chamber and orifices for use in arc interrupting apparatus in which, a shell member of a fluorocarbon resin is disposed adjacent the arcing areas of the interrupter apparatus and is provided with a support member of a less expensive material to complete the arc chamber or orifice.

Figure 1:
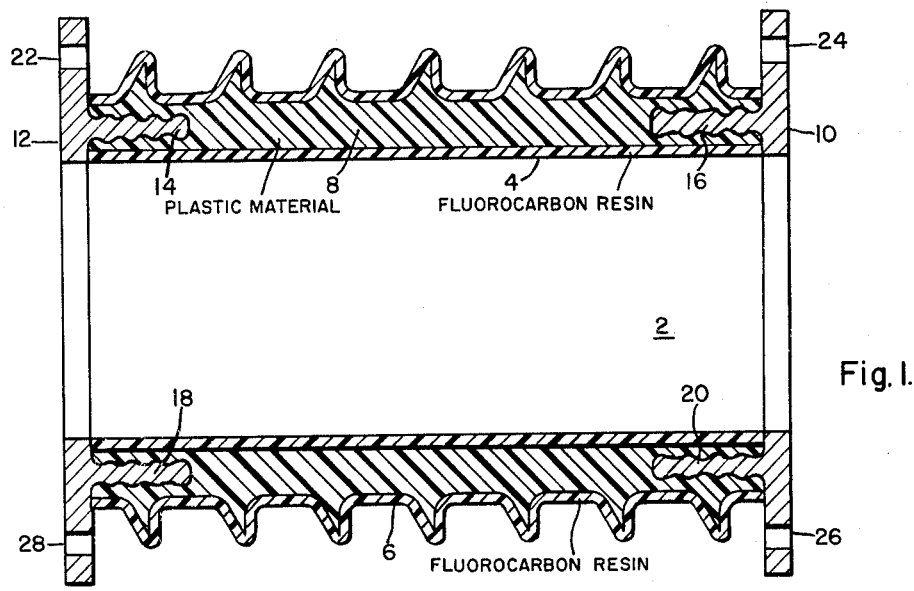
Figure 2:
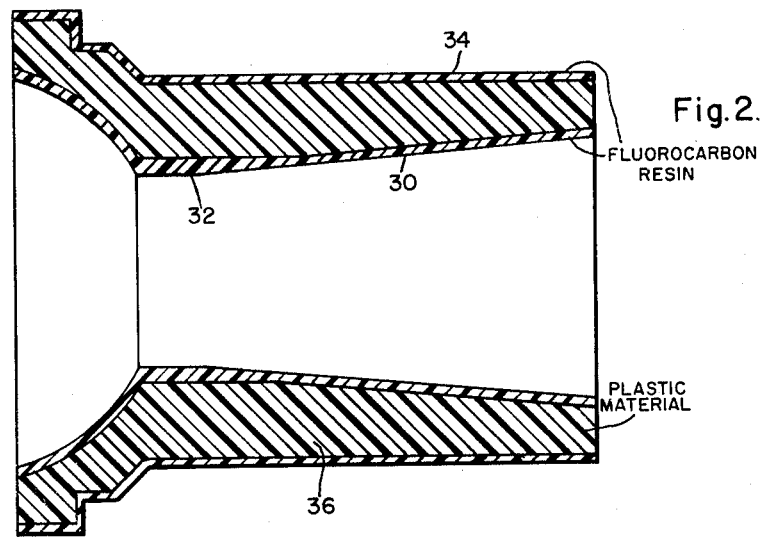

These and other objects will become more apparent when considered in view of the following specification and drawings, in which:

FIGURE 1 is a cross-sectional view of one embodiment of the present invention; and FIG. 2 is a cross-sectional view of another embodiment of the present invention.

Referring to FIG. 1, an arc chamber for use in arc interrupting apparatus is shown. Adjacent to the arcing area 2 is the inner shell member 4, which comprises a fluorocarbon resin such as tetrafluoroethylene resin, fluorinated ethylene propylene resins or polytetrafluoroethylene or similar fluorocarbon resins sold under the registered trademark "Teflon." The shell member 4 of the fluorocarbon resin can advantageously be made by the fluidized bed method, which is well known in the art. In the fluidized bed process, a substrate or mold is preheated to a predetermined temperature and then one side of the mold is dipped or exposed to the fluidized bed containing the finely powdered or divided fluorocarbon resin. A film of the fluorocarbon resin then adheres or fuses to the mold. The mold with the thin resin layer is then reheated again to a predetermined temperature to obtain the desired characteristics for the shell member. The mold is removed and the thin film of the fluorocarbon resin may be used as the inner shell of the arcing chamber. By this process, the shell thickness may be of the order from 15 to 30 mils. The shape of an arc chamber is generally cylindrical. Thus, the molds may be semicircular in shape and later fastened together to complete the hollow cylindrical arc chamber structure. The outer shell member 6 may be made by a similar process as that for the inner shell member 4. The corrugated surfaces or skirts as shown on the outer shell member 6 may be made by using such a suitably shaped mold. Such a shape increases the external creepage distance on the insulator surface, and in case of vertical mounting serves as rain sheds. It also aids in dissipating heat from the arc chutes. The outer shell member 6 will also be of a fluorocarbon resin as described above. A filler member 8 is placed between the shell members 4 and 6. The filler member 8 may comprise a less expensive material than the fluorocarbon resin, such as, a plastic material comprising a glass filled polyester, an epoxy resin, acetal resins, polystyrene, or polypropylene. The surfaces of the shell members exposed to the filler member may be treated with a sodium compound, as for example fused sodium hydroxide, so that the filler member will adhere tightly to the shell members. To complete the arc chamber, the end flanges 10 and 12 are affixed to the filler member 6 by, for example, molding the filler members around the protruding studs 14, 16, 18 and 20 of the end flanges 10 and 12. The end flanges 10 and 12 may be made of a metallic material. The holes 22, 24, 26 and 28 are provided in the end flanges 10 and 12 so that the arc chamber structure may be readily mounted to the arc interrupting apparatus.

With the arc chamber structure shown having the fluorocarbon resin shell member 4 adjacent to the arcing area 2, an arc chamber structure is provided having the advantages of: increased strength; decreased brittleness which reduces the danger of rupture during operation of the associated arc interrupting apparatus; the end flanges can readily be molded into the plastic filler member; the use of fluorocarbon resin decreases the amount of dirt that will adhere to the inner and outer surfaces of the insulator, while providing greater resistance from internal and external chemical attacks; and the low dielectric constant of such materials at the surface will reduce the dielectric stress concentration of the structure.

FIG. 2 shows an arc interrupter orifice structure which may be used in arc interrupting apparatus utilizing sulfur hexafluoride gas as the interrupting medium. The gas may be introduced into the chamber through such an orifice with parts of the orifice being exposed to the arcing area of the interrupter apparatus. Because of the high temperature and pressure in the arc chamber during the arcing period, the orifice must be similarly protected as the arc chamber itself from damage. In FIG. 2, the orifice has an inner shell member 30 which comprises a fluorocarbon resin. The inner member 30 may be produced by the fluidized bed method as discussed above in relation to FIG. 1. To provide additional protection from arcing breakdown of the orifice itself, additional layers of fluorocarbon resin may be added at the critical areas of the orifice inner shell 30. Such a critical area is shown at 32 with an additional thickness of the fluorocarbon resin being added at this area. The additional thickness of the area 32 may be provided by heating the mold form for the shell member 30 only at the area 32 and then reintroducing the form into the fluidized bed. By this process then, additional thickness may be added only at the area 32. The outer shell member 34 may be made by similar processes as discussed above of a fluorocarbon resin. The space between the inner shell 30 and the outer shell 34 is suitably filled with a plastic material, such as glass filled polyester, an epoxy resin or other material as described above. In many applications, the outer shell need not be used with the filler member 36 itself serving as the outer support member for the orifice structure. Through the use of a relatively inexpensive glass filled polyester or epoxy resin, the cost of the orifice is substantially reduced from that made from a resin solid stock of a fluorocarbon resin. However, the essential advantages of using a solid fluorocarbon resin member are provided in that the inner shell member, and in certain instances the outer shell member are fabricated from a fluorocarbon resin. The shell members on the whole may be made quite thin of the order of 15 to 30 mils, while certain areas, such as area 32 of the inner shell member 30, may be built to a greater thickness to add increased protection against damage from arcing within the arc chamber of the interrupting apparatus.

The orifice structure of FIG. 2 has similar advantages to the arc chamber structure of FIG. 1. Moreover, the additional advantages of allowing for the easy fabrication of varying shaped orifices through the use of molds is obtained by using the shell structure coating of fluorocarbon resin. Also, various projections may be attached to the orifice structure through the filler member 36. Further, if a solid fluorocarbon resin structure were used, waste results from the necessity of machining the member to the desired shape and providing the necessary attachments for mounting.

Although the present invention has been described with a certain degree of particularity, it should be understood that the present disclosure has been made only by way of example and that numerous changes in the details of construction, the material used and the combination and arrangement of parts may be resorted to without departing from the scope and spirit of the present invention.

I claim as my invention:

A hollow cylindrical orifice structure having arc resistant properties for use in circuit interrupting apparatus comprising a tubular support member formed from a material selected from the group consisting of a glass filled epoxy resin and a glass filled polyester resin, said support member having a longitudinal opening therethrough whose cross-sectional area gradually decreases from a maximum value at one end of said support member to a minimum value at a portion intermediate the ends of said support member and then gradually increases to an area at the other end of said support member which is intermediate said maximum value and said minimum value, and a layer of fluorocarbon resin secured to said support member to form both an outer surface and an inner surface for said support member around said opening, the thickness of said layer being relatively thin compared to the thickness of said support member with the thickness of said layer which forms the inner surface being relatively greater only adjacent to the portion at which the cross-sectional area of said opening is a minimum value.

References Cited by the Examiner

UNITED STATES PATENTS

| | | | |
|---|---|---|---|
| 2,523,082 | 9/50 | Wilson. | |
| 2,531,007 | 11/50 | Strom et al. | 200—149 |
| 2,897,386 | 7/59 | Jones | 174—211 X |
| 2,924,690 | 2/60 | Browne et al. | 200—149 X |
| 3,002,231 | 10/61 | Walker et al. | |

FOREIGN PATENTS

| | | |
|---|---|---|
| 220,363 | 2/59 | Australia. |
| 843,561 | 7/52 | Germany. |

JOHN F. BURNS, *Primary Examiner.*

JOHN P. WILDMAN, LARAMIE E. ASKIN,
*Examiners.*